UNITED STATES PATENT OFFICE.

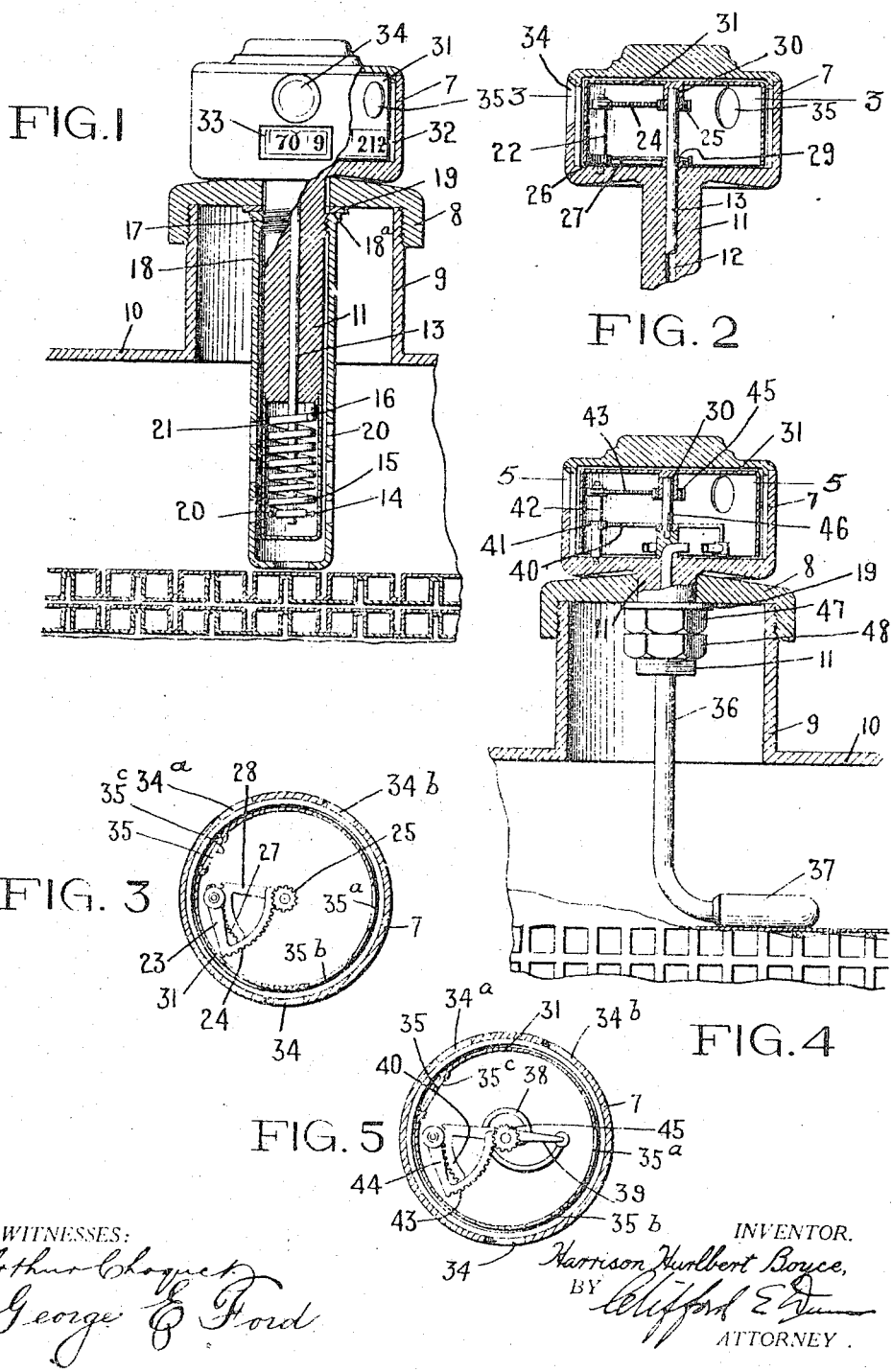

HARRISON HURLBERT BOYCE, OF FOREST HILLS, NEW YORK.

MEANS FOR INDICATING THE CONDITION OF INTERNAL-COMBUSTION ENGINES.

1,311,152. Specification of Letters Patent. Patented July 29, 1919.

Application filed June 20, 1914. Serial No. 846,247.

*To all whom it may concern:*

Be it known that I, HARRISON HURLBERT BOYCE, a citizen of the United States, residing at Forest Hills, in the county of Queens and State of New York, have invented certain new and useful Improvements in Means for Indicating the Condition of Internal-Combustion Engines, of which the following is a full, clear, and exact description.

The present invention relates to improvements in means for indicating the condition of internal combustion engines, and is particularly directed to the provision of a device, which may be readily attached to and form a component of a power plant of a motor vehicle, motor boat or the like, my invention being primarily adapted to provide an efficient means which, at all times and under all conditions, will constantly keep the operator of an engine informed of the condition of the engine, so that he may obtain the greatest efficiency possible under economic operation, and which will also immediately warn him of any trouble from any overheating cause whatsoever arising in the power plant of which my invention is a part, in order that such trouble may be rectified and injury to the engine or other parts of the power plant avoided.

One of the main objects of my invention is to provide a means for indicating the condition of internal combustion engines, as aforesaid, which will at all times show the variations in the engine temperatures, the changes in the temperature being gradually and clearly indicated as they occur under normal running conditions of the engine, the construction and arrangement of the parts of my device being such that as soon as an abnormal condition of operation of the engine is produced by any trouble incident to any overheating cause whatsoever, my device will function immediately to provide a signal of sufficient emphasis to arrest or attract the attention of the operator of the engine, means being further provided to render this signal readily observable at night, as well as by day, so that under all and any conditions of use, the operator may be constantly advised of the running condition of his engine.

My invention further contemplates a device of the character aforesaid, which will be readily adaptable to use in connection with portable power plants, such, for instance, as employed in a motor vehicle, in such cases my improved means for indicating the temperature of the engine being preferably located or positioned on the filler cap of the radiator, a portion of my device extending or projecting within the radiator into the air space above the water level therein or being submerged within the water itself, this portion, which is provided with an element adapted to be influenced by the temperature of the atmosphere or the water within the radiator, being connected to and adapted to operate certain mechanism contained within a casing or suitable housing secured to the outside of the filler cap or other part of the filler mouth or opening, this mechanism embodying means for registering the temperature of the circulating or cooling water within the radiator in a manner which will be visible to the operator of the engine at all times, even though the operator may be situated at a considerable distance from the registering mechanism.

It is to be understood, that while I have shown certain specific embodiments of my invention these illustrations of the employment of my invention have been selected merely for the purpose of rendering a clear and comprehensive disclosure thereof, and I do not limit myself to such specific forms of use or to the specific details of structure embodied therein, it being obvious that many changes in the arrangement and connection of the parts of my device may be made without departing from the spirit and scope of my invention.

I shall now proceed to describe my invention with reference to the structure shown in the drawings and then proceed to point out with more particularity, the essential points of novelty therein, in the appended claims.

In the drawings;

Figure 1 is an elevation partly in section of one form of my invention, in which the temperature responsive element is in the form of a thermostat.

Fig. 2 is a fragmentary sectional elevation of the structure shown in Fig. 1, illustrating the means whereby the cylinder carrying the temperature indicia is operated or rotated.

Fig. 3 is a sectional plan view on the line 3—3 of Fig. 2.

Fig. 4 is a sectional elevation of an embodiment of my invention, wherein mercury or a similar fluid is employed as the temperature responsive element.

Fig. 5 is a sectional plan view on the line 5—5 of Fig. 4.

Referring now to the drawings in detail, in which like reference characters are employed to designate similar parts throughout the several views and more particularly to the preferred form of structure as shown in Figs. 1, 2 and 3, 7 indicates an annular casing or housing formed of any suitable material, which is adapted to be mounted upon the cap 8 of the filler opening or spout 9, leading to the interior of the radiator 10 of a motor vehicle. While I have shown this casing cylindrical in shape, it is obvious that it may be rectangular, hexagonal, or of any other suitable configuration. Dependent from the bottom of the casing 7 is a portion 11 provided with a central bore 12, which forms a bearing for the shaft or rod 13 to the lower end of which is pinned or fastened at 14, a thermostatic spring 15, the upper end of the spring being suitably secured to a boss or projection 16 formed at the lower end of the dependent portion 11.

As will be observed, the exterior of the portion 11 adjacent to its upper end, is suitably threaded at 17, so as to receive the threaded thimble or cap 18, the upper end of which is outwardly flanged at 18ª and is adapted to engage with the washer or gasket 19, whereby the filler cap 8 may be firmly clamped between the thimble 18 and the bottom of the casing or housing 7, thus securely holding my device in operative position. The lower end of the thimble 18 is provided with apertures or orifices 20 adjacent to the thermostatic spring 15, the spring being housed within the cap or containing member 21, formed to engage with the lower contracted end of the dependent portion 11, and supported thereby, as shown in Fig. 1, a space being formed between the exterior of said cap 21 and the interior of the thimble 18. Journaled within the casing or housing 7, as shown in Fig. 2, is a stud 22, the upper end of which is provided with an outwardly directed arm 23, supporting a toothed segment 24, adapted to engage with a pinion 25, mounted on the shaft 13, while a pinion 26 is mounted adjacent to the other end of the stud 22 which is arranged to mesh with the teeth of the segment 27, supported by the arm 28, keyed to the shaft 13 as shown at 29. The upper extremity of the shaft 13 is journaled in the boss 30, to which the pinion 25 is rigidly fastened, this boss forming a part of an annular inner casing or indicia carrier 31, which is adapted to be rotated in the manner and for the purposes hereinafter explained. The outer surface or wall of this casing 31 is provided with suitable figures or indicia 32 which are adapted to be brought to view or rendered visible through the sight opening 33 in the casing 7, as the interior casing 31 is rotated. The casing 7 is provided with a plurality of apertures 34, 34ª and 34ᵇ with which the openings 35, 35ª and 35ᵇ in the inner casing or indicia carrier 31 are adapted to register under predetermined conditions and provide a signal which will be visible at night or under other dark atmospheric conditions, as will be hereinafter more fully explained.

In the structures shown in Figs. 4 and 5, in lieu of the thermostatic spring 15, I employ a flexible tube 36, having a bulb portion 37, for containing mercury or any other suitable expansible fluid, the tube 36 being normally coiled within the casing or housing 7, as shown at 38 in Fig. 5, and connected to an arm 39 provided with a toothed segment 40 at its other end, this toothed segment being adapted to engage the pinion 41 mounted on the stud 42, whereby upon the expansion of the fluid within the tube 36, which will have a tendency to straighten out the portion 38 thereof, as hereinafter set forth, the said stud will rotate and the segment 43 supported thereby, through the medium of the arm 44, will mesh with the pinion 45 rigidly secured to the interior of the inner casing 31, and rotate the same, on the stud 46, the result being similar to that obtained under the action of the thermostatic spring illustrated in Fig. 1. In the structure shown in Figs. 4 and 5, the casing is secured to the filler cap by means of a washer 19 and locking nuts 47 and 48 threaded on the dependent portion 11 of the casing 7.

The use of the flexible tube depending into the radiator is not claimed herein as the same forms the subject matter of a divisional application filed by me.

In the embodiments of my invention illustrated it will be observed that the temperature responsive elements are of a length sufficient to adapt them to be submerged in the circulating fluid within the radiator on its return from the engine cylinders or water jackets. The water flowing in from the water jackets being heated by its passage about the cylinders will act upon the temperature responsive elements and the temperature indicating mechanism will be actuated thereby to register the temperature of the circulating fluid and inform the driver of the engine of the conditions under which it is running. For instance, in the structure shown in Figs. 1 and 2, where a thermostatic spring is employed, the expansion or contraction of the spring 15, under the influence of the temperature of the water impinging against the cap or containing member 21, will rotate the shaft 13, which, through the medium of the pinions 25 and 26 and the segments 24 and 27 in mesh, as hereinbefore explained, will revolve the drum or indicia carrying member 31 on its bearings, the movement of the drum being relatively proportioned to the movement of the spring under a predetermined degree of temperature, so as to accurately show the temperature of the circulating fluid by means of the indicia carried by said drum. The operation is substantially the same in the structures shown in Figs. 4, and 5, in which the temperature responsive element consists of a flexible tube 36 and bulb 37 containing an expansible fluid, such as mercury or the like. In this case, when the fluid expands, it is obvious that the spring or coiled tubing 38 will gradually expand or straighten out and thereby operate the segments 40 and 43 and the pinions in mesh therewith, the indicia carrying drum being thereby rotated on its axis.

It will be obvious that in the embodiments of my invention shown the specific operation of which I have just described, the expansion or contraction of the temperature responsive element will gradually rotate the drum or indicia carrying member on its axis as the temperature of the circulating fluid changes bringing the indicia representing the temperature of the circulating fluid, within the sight opening 33. By this means the operator of the engine is constantly informed of the condition of his engine, as it is well known that in the operation of internal combustion engines, any variation in the efficiency thereof will immediately result in a change of temperature of the engine, which will be almost instantly communicated to the circulating fluid. The normal degree under which the highest efficiency is obtained is greater in some types of internal combustion engines than in others, but in every type, when the condition of the engine reaches an abnormal stage from any cause whatsoever, which will result in overheating, the temperature thereof will quickly rise to a degree which will be communicated to the circulating fluid and raise its temperature to the boiling point. This high temperature may be caused by a broken fan belt, a leak in the cooling system or by various other causes known to those versed in the art to which this invention appertains. Therefore, it is manifest that it is of the utmost importance that the driver of an internal combustion engine be immediately informed on his engine reaching a stage of operation above the normal. By the employment of my invention, this is readily rendered possible, as the indicia on the rotatable drum 31 will inform him of the temperature of the circulating fluid and of the consequent condition of his engine.

However, it is apparent that at night or under dark atmospheric conditions, it might not be possible to readily discern or distinguish the indicia within the sight opening 33, and for this purpose I have arranged to give a specific signal, which will serve to warn the engine operator of engine trouble. This is produced by the provision of the apertures 34, 34$^a$, and 34$^b$ in the casing 7 and the openings 35, 35$^a$, and 35$^b$, in the wall of the rotatable drum 31. The opening 35 in the wall of the drum is positioned immediately above the specific indicia which indicates that the temperature of the circulating fluid has reached the boiling or danger point. Therefore, upon the predetermined movement of the rotatable drum through the medium of the expansion of the temperature responsive element, this opening 35 will be brought into register with the aperture 34 positioned above the sight opening 33 in the front of the casing 7. Coincident with the registration of these openings, the openings 35$^a$ and 35$^b$ will correspondingly register with the apertures 34$^a$ and 34$^b$ in the casing 7. By this means, it is obvious that the reflected light rays from the headlights of the motor vehicle to which my invention may be applied will filter through the registered openings 34$^a$ and 34$^b$, and 35$^a$ and 35$^b$, illuminating the interior of the drum and casing 7 and become visible through the registered openings 34 and 35. The opening 35 is preferably provided with a crystal or glass 35$^c$, which may be red or of any other suitable color, if desired, to make the signal more pronounced. It will be seen that this arrangement is particularly advantageous, since it is of a nature to attract the attention of the engine operator immediately upon the circulating fluid reaching a temperature which would indicate an abnormal engine condition.

It will be understood that if desired an instrument constructed in accordance with the present invention may be so proportioned and organized in connection with the engine cooling system as to have its temperature responsive element normally located in a space above the normal water level in the radiator in the manner and with the operation described in my Patent No. 1,090,776, instead of having the temperature responsive element extend so as to be normally submerged in the water itself.

While I have described my invention with reference to the specific details of structure herein shown, it is obvious that the same may be varied in many ways without departing from the spirit and scope of my invention.

Having thus described my invention what I claim as new herein and desire to secure by Letters Patent is:—

1. In apparatus of the character described, the combination with the radiator of a water-cooled internal combustion engine, said radiator having a filler spout and cap for closing the same, said cap having an opening formed therethrough, of a temperature indicating instrument mounted on said cap and comprising a casing mounted above the cap and having a stem of reduced diameter projecting through the opening in the cap, said instrument having a temperature responsive element carried by the stem and located within the radiator, said element being of such dimensions as to permit it to be passed through the opening in said cap, said casing having a window in the rear, a drum within the casing mounted to rotate about a vertical axis and having a horizontal series of temperature indicating indicia thereon adapted to be successively exposed to view through said window, means engaging the portion of the stem projecting below the cap for securing the instrument to the cap, and movement transmitting means connected with said temperature responsive element and arranged to rotate said drum.

2. In apparatus of the character described, the combination with the radiator of a water-cooled internal combustion engine, said radiator having a filler spout and a cap for closing the same, of a temperature indicating instrument mounted on said cap and including a casing having an opening in the rear and having a front opening to permit light to enter said casing, a movable colored translucent member adapted to be moved into and out of visible position in front of the rear opening of the casing, temperature responsive means within the radiator and means controlled thereby for actuating said member.

3. In apparatus of the character described, the combination with the radiator of a water-cooled internal combustion engine, of a temperature indicating instrument including a casing mounted above said radiator and having openings in the rear and having a front opening to permit light to enter said casing, a movable member mounted in said casing and having a series of temperature indicating indicia thereon, adapted to be successively exposed to view through one opening in the rear of the casing, said member also carrying a colored translucent member adapted to be moved into and out of visible position in front of another rear opening in the casing and temperature responsive means within the radiator for actuating said movable member.

In witness whereof I have hereunto set my hand in the presence of two subscribing witnesses.

HARRISON HURLBERT BOYCE.

Witnesses:
WM. C. DUNN,
LILLIAN C. BUTLER.